June 19, 1962
E. MATTIOLI
3,039,733
FLUID FLOW CONTROL VALVE
Filed Dec. 28, 1959
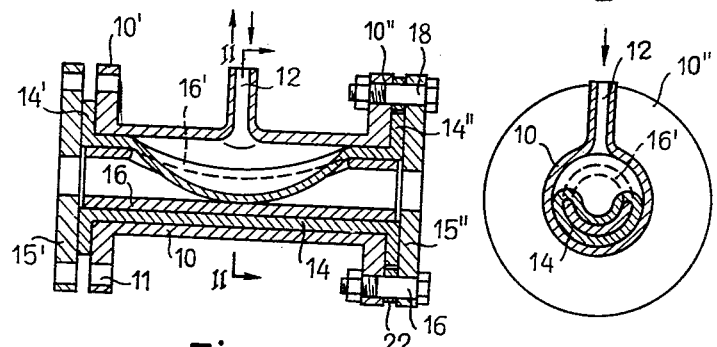
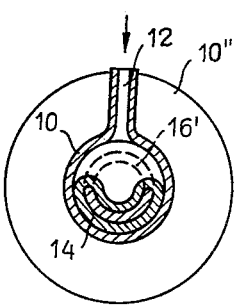
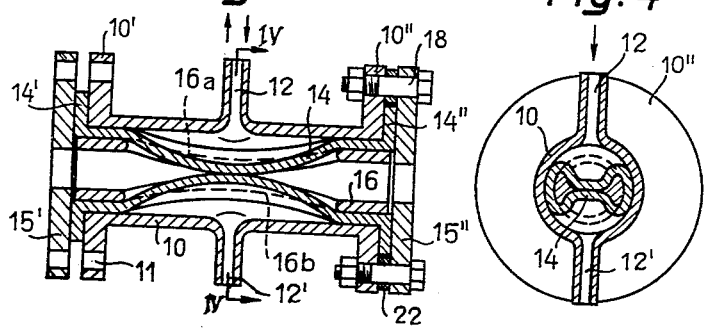
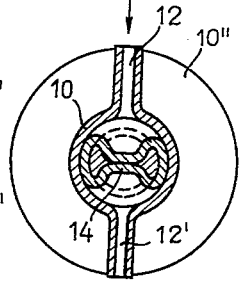
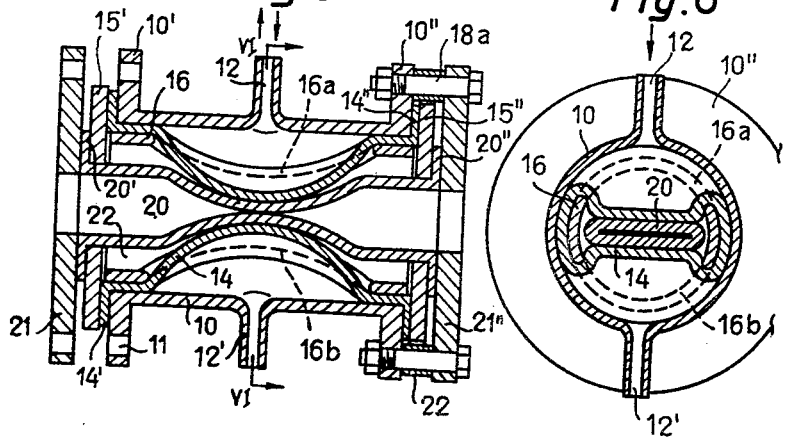
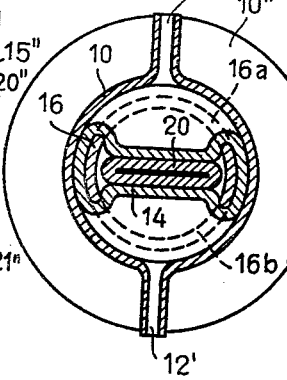

United States Patent Office 3,039,733
Patented June 19, 1962

3,039,733
FLUID FLOW CONTROL VALVE
Ennio Mattioli, Terni, Italy, assignor to Montecatini Societa Generale per l'Industria Mineraria e Chimica, Milan, Italy
Filed Dec. 28, 1959, Ser. No. 862,130
Claims priority, application Italy Dec. 30, 1958
2 Claims. (Cl. 251—5)

This invention relates to valves for fluid conveying conduits generally, of the type including a collapsible sleeve. Such values usually comprise a rigid tubular body enclosing the sleeve and a metal clamp operated by a handwheel for collapsing the sleeve and intercepting or throttling the fluid flow therethrough.

Some valve constructions can be remotely controlled by operating the clamp by means of a hydraulically or pneumatically actuated piston. However, such constructions are relatively elaborate, expensive and difficult to install; moreover, the provision of the mechanical clamp and guides therefor, cylinder, piston, return spring and further accessories requires a constant supervision and frequent maintenance operations. Moreover, the rubber sleeves are often excessively stressed by forced bending or drawing, which results in interruptions in service, frequent replacement and repair in case of breakdown.

This invention provides a valve of the abovementioned type, avoiding the drawbacks referred to above, the said valve comprising a tubular body enclosing the sleeve in a tight-sealing relationship at the sleeve ends, and means for supplying a pressure fluid between the tbular body and sleeve in order to collapse the latter.

Moreover, the sleeve encloses a rigid member adapted to define the desired sleeve configuration on collapsing.

It will be seen from the appended description that the above features alone and in combination with further details afford an easy remote control of the valve by means of an operating fluid, the valve structure is extraordinarily simple and the provision of the rigid inner member permits of accurately defining the sleeve configuration on collapsing, avoiding sharp angles on bending or excessive stretching.

The accompanying drawings show embodiments of this invention by way of example.

FIGURES 1, 3 and 5 are axial sectional views of three valve embodiments, and

FIGURES 2, 4 and 6 are corresponding cross-sectional views on lines II—II, IV—IV and VI—VI, respectively.

Throughout the figures 10 denotes a tubular body of rigid material, such as metal, of circular cross-sectional shape, having at each end a circumferential flange 10', 10'' having a circular row of holes 11 bored therethrough. A tubular connection 12 extends to an intermediate zone on the body 10 and is adapted to be connected with a pressure fluid control conduit. The pressure fluid can be oil or compressed air. 14 denotes a flexible sleeve, which is not necessarily resilient, inserted into the body 10, of an outer diameter substantially equalling the bore of the body 10. The opposite ends of the sleeve 14 provide flanges 14', 14'', respectively, each flange being pressed pressure-tight against the forward face of its respective flange 10', 10'' on the body 10 by means of annular discs 15', 15''. In the embodiments shown in FIGURES 1–4, the annular discs are clamped against the flanges on the body by means of bolts 18 fitted into the holes 11 in the flanges.

In the embodiments shown in FIGURES 1 and 2 the sleeve 14 has narrowly slipped therein a bushing 16 of rigid material extending approximately throughout the length of the sleeve and having a lateral elongated aperture 16' cut through an intermediate region thereof, facing the connection 12. The aperture is of generally shuttle shape having rounded edges, its depth equalling approximately half the diameter of the bushing 16.

Assuming the valve shown in FIGURES 1 and 2 is interposed in a fluid conduit so that the fluid flows through the bushing 16, it will be sufficient to supply between the body 10 and sleeve 14 through the connection 12 a control fluid under a pressure exceeding the pressure prevailing in the conduit, in order to either partly or fully collapse the sleeve in the manner shown by way of example on the drawing; the wall region on the sleeve adjacent the aperture 16' then bows through the aperture till it is tightly pressed against the inner surface of the bushing 16, thereby intercepting the fluid flow through the bushing, i.e. in the conduit controlled by the valve. To this end the connection 12 can be connected with a pressure transmitter or similar remote control. Care should be taken to tighten the bolts 18 in order to obtain an effective seal against the pressure of the control fluid supplied at 12.

The edges of the aperture 16' are conveniently rounded as shown in FIGURE 2 in order to avoid collapsing at sharp angles of the sleeve 14.

The embodiment shown in FIGURES 3 and 4 differs from the construction according to FIGURES 1 and 2 in that the bushing 16 has two apertures 16a, 16b, substantially similar to the aperture 16', cut therethrough, at diametrically opposite regions on the bushing. It is clear that in this construction bowing of the walls of the sleeve 14, hence elongation of these walls are reduced to about one half with respect to the previous construction, on account of the fact that the sealing contact occurs between two sleeve walls which are bowed towards each other. In this construction one connection 12 is generally sufficient; however, if necessary, a further connection can be provided diametrically opposite the former, as indicated at 12', so that equal control pressures can be applied to both walls of the sleeve 14 facing each other through the apertures 16a, 16b.

The provision of the bushing 16 on the fluid path, i.e. within the valve-controlled conduit may eventually not be convenient, for incrustations may occasionally form on the edges of the aperture or apertures and become liable to alter operation of the device. Alternatively, the material of the sleeve 14 may be incompatible with the fluid flowing through the valve or with the conditions, such as temperature or pressure of the said fluid. The construction shown in FIGURES 5 and 6 may then be adopted. The latter construction differs from the previously described ones chiefly in that the bushing 16 having two opposite apertures 16a, 16b cut therethrough has coaxially inserted therein a flexible tubular section 20, which is not necessarily resilient, the ends of which extend to the outside through the middle apertures in the discs 14', 14'' and widen to provide flanges 20', 20'' pressed against the outer faces of their respective discs by means of a further pair of annular discs 21', 21'' and bolts 18a. Tightening of the latter bolts seals both the sleeve 14 and tubular section 20. It should be noted that in all constructions shown the bolts 18, 18a have slipped thereon spacing sleeves 22, the length of which is in any case such as to avoid excessive compression of the flanges 14', 14'' and 20', 20''.

The tubular section 20 is preferably radially spaced from the bushing 16 to provide therebetween a tubular clearance 22 filled with a fluid which may be liquid or gaseous according to requirements. The tubular section 20 may be made of canvas or any material which is flexible enough and compatible with the fluid flowing through the valve and conditions of flow. The sleeve 14 is thereby relieved from direct action by the conveyed fluid and temperature and/or pressure thereof, without objectionably affecting operation of the valve. In FIGURES 5 and 6 the valve is shown in its closed condition, in which the pressure of the control fluid fed through the connections 12, 12' collapses the sleeve 14 causing its walls to bow through the apertures 16a, 16b to collapse the tubular section 20 in the manner shown. If the clearance 22 is filled with a non-compressible fluid (liquid), the latter assists the sleeve 14 in acting as a clamp on the tubular section 20 improving effectiveness of the valve in its sealing condition.

It is believed that the indications given above will enable the man of the art to understand the spirit of this invention and criteria of carrying it out; of course, certain constructional details can be modified according to circumstances without departing from the scope of this invention as defined by the appended claims.

What I claim is:

1. Fluid flow control valve of the collapsible sleeve type comprising a tubular rigid body surrounding the sleeve in a pressure tight relationship at the sleeve ends, means for supplying a pressure fluid between the tubular body and sleeve in order to compress the sleeve thereby closing the valve, a rigid bushing member enclosed concentrically by the sleeve having an axially elongated aperture in its wall defining the desired configuration of the sleeve in compressed condition, a flexible conduit section for the controlled flow of fluid extending axially through the said member for being collapsed by the compressing of said sleeve, and means defining a closed space, between said sleeve and said flexible conduit section, said space being filled with incompressible fluid, whereby a partial compression of said sleeve completely collapses said flexible conduit.

2. Fluid flow control valve of the collapsible sleeve type comprising a tubular rigid body surrounding the sleeve in a pressure tight relationship at the sleeve ends, means for supplying a pressure fluid between the tubular body and sleeve in order to compress the sleeve thereby closing the valve, a rigid bushing member enclosed concentrically by the sleeve having a pair of diametrically opposite axially elongated apertures in its wall defining the desired configuration of the sleeve in compressed condition, and a flexible conduit section for the controlled flow of fluid extending axially through the said member for being collapsed by the compression of said sleeve and means defining a closed space, between said sleeve and said flexible conduit section, said space being filled with incompressible fluid, whereby a partial compression of said sleeve completely collapses said flexible conduit.

References Cited in the file of this patent

UNITED STATES PATENTS

| 2,291,912 | Meyers | Aug. 4, 1942 |
| 2,467,150 | Nordell | Apr. 12, 1949 |
| 2,706,612 | Ratelband | Apr. 19, 1955 |
| 2,904,063 | Wall | Sept. 15, 1959 |
| 2,994,336 | Bryan | Aug. 1, 1961 |

FOREIGN PATENTS

| 758,037 | Germany | 1955 |